United States Patent [19]

Carlsen

[11] 4,421,383
[45] Dec. 20, 1983

[54] OPTICAL FIBER CONNECTORS

[75] Inventor: W. John Carlsen, Boston, Mass.

[73] Assignee: GTE Laboratories Incorporated, Waltham, Mass.

[21] Appl. No.: 440,139

[22] Filed: Nov. 8, 1982

Related U.S. Application Data

[63] Continuation of Ser. No. 112,991, Jan. 17, 1980, abandoned.

[51] Int. Cl.³ .............................................. G02B 7/26
[52] U.S. Cl. .......................... 350/96.21; 350/96.18; 350/96.20
[58] Field of Search ................ 350/96.18, 96.20, 96.21

[56] References Cited

U.S. PATENT DOCUMENTS

| 3,649,098 | 3/1972 | Suverison | 350/96.18 |
| 4,147,402 | 4/1979 | Chown | 350/96.18 |
| 4,257,674 | 3/1981 | Griffin et al. | 350/96.21 |
| 4,290,667 | 9/1981 | Chown | 350/96.18 |
| 4,325,607 | 4/1982 | Carlsen | 350/96.21 |

FOREIGN PATENT DOCUMENTS

| 2703887 | 8/1977 | Fed. Rep. of Germany | 350/96.18 |
| 2722367 | 12/1977 | Fed. Rep. of Germany | 350/96.18 |
| 2746497 | 4/1978 | Fed. Rep. of Germany | 350/96.18 |
| 2334969 | 7/1977 | France | 350/96.18 |

*Primary Examiner*—John D. Lee
*Attorney, Agent, or Firm*—Fred Fisher

[57] ABSTRACT

A telecentric optical fiber connector, wherein light from an optical fiber is emitted from the connector lens in a comparatively large diameter parallel beam, includes two primary components: an integral optical quality plastic connector body having an annular planar reference surface substantially perpendicular to an optical axis. A convex lens surface is molded, recessed inward from the reference surface. The body is substantially cylindrical, with exterior means thereabout so that it can be engaged with a similar body. The opposite axial end of the body has a central cylindrical cavity therein which extends to a point which is one focal length from the lens surface. A fiber holder, which holds an optical fiber centrally within an axial hole, abuts an end of the fiber against the point one focal length from the lens surface, and can be engaged with index-matching material.

29 Claims, 4 Drawing Figures

OPTICAL FIBER CONNECTORS

CROSS-REFERENCE TO RELATED APPLICATIONS

This application is a continuation of U.S. patent application Ser. No. 112,991, filed Jan. 17, 1980, now abandoned.

Related patent applications include U.S. patent application Ser. No. 023,862, filed Mar. 26, 1979, entitled "Method of and Apparatus for Connecting Optical Fibers", by W. John Carlsen, now U.S. Pat. No. 4,325,607, issued Apr. 20, 1982, and U.S. patent application Ser. No. 032,583, filed Apr. 23, 1979, entitled "Elastomeric Fiber Optic Splice", by Wendell L. Griffin, W. John Carlsen, and John E. Benasutti, now U.S. Pat. No. 4,257,674, issued Mar. 24, 1981.

BACKGROUND OF THE INVENTION

1. Field of the Invention

This invention relates to optical fiber connectors, and, in addition, to optical fiber connector bodies, optical fiber holders, and combinations thereof. Accordingly, it is a general object of this invention to provide new and improved devices of such character.

2. Description of the Prior Art

With some exceptions, including those listed below, previous fiber optic connectors essentially have been devices for physically bringing the ends of the two fibers together so closely and accurately as to minimize the disturbance of the optical waveguide geometry of the fibers as light passes from one to the other. Disadvantageously, except for those situations involving very large diameter fibers, extreme mechanical tolerances have been required. The competing requirements of close tolerances on one hand, and permitting a large number of connect-disconnect cycles with little degradation on the other hand, are exceptionally difficult to achieve in the same device. In particular, connectors intended for small core communications-grade fibers with less than 1 dB loss have been possible only by using very expensive individually machined and aligned parts. They usually cannot be reliably installed in the field. In addition, the small fiber ends must be kept clean and free from scratches, or the optical throughput efficiency decreases rapidly; and a small particle caught between two connectors has often resulted in crushed or fractured fiber ends.

Known exceptions use lenses of various types to transfer the optical power between the ends of the two fibers physically separated from one another. All but one of these use a symmetrical imaging optical system with half of the optics in each of the connectors such that the light is more or less collimated into an expanded beam of parallel rays. The present invention falls in this category. Such an optical connector, if all of the parts of each connector are accurately aligned relative to one another and to the fiber within the connector, presents the advantage of loose tolerance of lateral offset and axial separation between the connectors, but at the cost of more stringent angular alignment tolerance between the connectors compared with the case of physically abutted fibers. The major differences among the various designs are the techniques for assuring the internal tolerances and alignment of the connector parts, the methods of attaching and aligning the fiber to the connector, and the means (if any) for assuring precise angular alignment at the interface of the two connectors. Known optical connector designs using lenses are:

a. Discrete conventional lenses with the fiber positioned at the focal point of the lens, and air between the fiber and the lens, as suggested by M. A. Bedgood, J. Leach, and M. Matthews, "Demountable Connectors for Optical Fiber Systems", *Electr. Commun.* (U.K.), Vol. 51, pp. 85–90, 1976. The alignment of all parts, and of the connectors to one another at the interface, are maintained by accurate machining and individual alignment procedures. Disadvantageously, a discrete lens must be carefully aligned in a precision connector housing, with its optical axis oriented accurately along the axis of the housing. Then, a fiber must be manipulated to be precisely along the same axis, with its end at the focal point of the lens. Also, the fiber and lens have three glass-to-air interfaces in each connector, which must be anti-reflection coated to achieve minimum losses.

b. Glass sphere with index of refraction very close to 2.00, the case in which collimated light from one side focuses onto a small spot on the opposite side, as suggested by A. Nicia, "Practical Low-Loss Lens Connector for Optical Fibers", *Electronics Lett.*, Vol. 14, pp. 511–512, August, 1978. The problem of placing the fiber at the correct distance from the lens then becomes trivial, since the distance is zero and the fiber is simply abutted to the sphere surface. Index matching material may be used between the fiber and sphere lens to partially reduce reflection losses. Other alignment tolerances must be dealt with by accurate machining of parts and individual alignment procedures. Disadvantageously, this is the only critical alignment eliminated (and one of the least critical) of those listed above.

c. Rod lens used as in paragraph b above instead of the glass sphere. Numerous glass and plastic versions of this have been reported. (West Germany Patent No. 2,746,497 may fit this category; an English translation thereof has not been obtained, nor reviewed.) The rod lens is a cylindrical rod with a lens surface at one end and with the other end being a flat surface at the focal plane of the lens surface. The fiber is abutted directly to the rod lens back surface. The index of refraction of the lens material can be much lower than that of the sphere and can be much more easily index matched to the fiber index, almost completely eliminating reflection losses at these two faces. The cylindrical geometry allows a better alignment of the lenses of two connectors if both are inserted into a common close-fitting cylindrial tube. Disadvantageously, it still has all of the alignment problems of the sphere lens.

d. A quarter-pitch gradient-index rod lens, used like the uniform glass rod lens in paragraph c above. This has all of the above features, but in addition has no curved surface at the connector interface. A precise radial variation of the index of refraction of the rod material can produce much the same collimating/focusing action as the uniform rod with a curved end surface. Thus, the angular alignment of two lenses can be assured by abutting their two flat surfaces together, assuming that the lenses have end surfaces which are accurately made to be perpendicular to the lens optical axes. Furthermore, index-matching material may be used between these flat surfaces as well as between the lens and the fiber to virtually eliminate all reflection losses.

There are several disadvantages of this approach. A fluid interface between the lenses is difficult to maintain in the field, and tends to attract environmental contaminants which can scratch the surfaces or reduce transmittance; it is almost impossible to clean. Without a fluid interface, contact between the two non-index matched surfaces may produce interference effects which can cause additional reflection losses and modal noise. Furthermore, known prior art manufacturing tolerances for the index profile result in significant losses when the fiber is abutted to the rod end. And, as with the above designs, no means is provided for aligning the fiber laterally or angularly to the optical axis of the rod lens, so external precision alignment of the lens and fiber to the housing are still required.

e. Rod lens with integral fiber-alignment means. The lenses detailed in paragraphs b, c, and d, above, provide for trivial axial alignment of the fiber at the correct distance from the lens (namely, abutted directly against the lens itself). Various designs have additionally incorporated into the shape of the lens an integral cylindrical recess with substantially the same diameter as that of the fiber to be used, thus providing a measure of lateral and angular alignment of the fiber with respect to the lens optical axis. U.S. Pat. No. 4,183,618 to Rush et al., issued Jan. 15, 1980, suggests such design. West Germany Patent No. 27 22 367 to Combined Optical Ind., describes the addition of a conical entrance to the cylindrical recess to receive excess optical liquid which is squeezed out during insertion of a fiber. Both patents describe means separate from the integral lens for holding the fiber in place: Rush et al. describes a connector with longitudinally extending tensioned wires for holding the external fiber in alignment with a short length of optical fiber from the lens aperture, while West Germany Patent No. 27 22 367 describes a neoprene cushion or bolster which is squeezed to hold the fiber. Both indicate that an optical coupling material can be used in the cylindrical fiber recess. U.S. Pat. No. 4,147,402 to Chown, issued Apr. 3, 1979, describes another version, using an intense laser beam to form the fiber recess.

Disadvantageously, the cylindrical recess suffers from the same problem as butt-type connectors which use a cylindrical ferrule to align the fibers to the connector axis. Manufacturing tolerances on the outside diameter of optical fibers are sufficiently significant to require an oversized hole diameter to assure that the fiber in hand will fit into it. Though selected fibers of a maximum external diameter may assure a tight fit, as suggested by Rush et al., fibers on the small end of the tolerance range usually end up offset from the optical axis since the cylindrical recess does not center the smaller fiber. In commercial connectors which utilize a rigid cylindrical hole to align the fiber, losses due only to this effect have been observed to be often greater than 1 dB, in excess of the losses due to other tolerances. Furthermore, as with other designs above, the connector housing must provide precision means for aligning the optical axes of the lenses within very tight angular tolerances.

f. Rod lens as in paragraph e above, with an integral surface for alignment of the lenses within the connector housings, as in French Patent No. 2334969 to Cosneau, which describes an annular shoulder around the edge of the lens and recessed back from the convex lens surface. This shoulder mates with an annular surface in a separate connector housing, and another annular surface of the housing mates with a matching one on the other connector's housing. When all three pairs of matable surfaces are properly mated, the two lenses in the two connectors are automatically aligned to the extent of the sum of the mechanical errors in the lens and housing parts. Cosneau also optionally describes an integral fiber-aligning recess as in paragraph e, above, with an additional integral cavity to accept the fiber coating or sleeve, which has been stripped back only to the length of the smaller fiber recess.

Disadvantageously, the connector housing must still bear the burden of providing extremely accurate, generally individually machined or adjusted, mating reference surfaces to utilize the recessed reference surfaces of the lenses. All six of the critical mating surfaces in a connector pair must be made so accurately that the sum of their errors adds up to less than the angular tolerance needed for low-loss connection.

g. Multi-lens junction between two fiber-holding connectors as described in U.S. Pat. No. 4,119,362 by Holzman, issued Oct. 10, 1978. Optical alignment is achieved with a single molded lens part in a central junction. This part has two concave lens surfaces molded aligned to one another, one on each end. This is not an expanded-beam connector (i.e., one where the light exiting from an optical fiber is expanded into a beam many times the diameter of the fiber); the diameter of the lenses, and of the light distribution between them, are approximately the diameter of the fiber. Conical guides extend from the lens surfaces to aid in directing the fibers to the lens. They also provide precise axial centering of the fiber end for various fiber end diameters within the tolerance range of fiber manufacturing.

The lens-tipped conical indents are filled with an optical fluid or other material which has an index of refraction higher than that of the plastic lens, thus producing two additional fluid lenses bounded by the curved plastic surface and the flat fiber end. The resulting three-element complex lens produces what appears to be approximately an optical Fourier transform of the source fiber light distribution on the receiving fiber end. This transform yields potentially advantageous mode-mixing, and yields an acceptable coupling efficiency if the fiber has a parabolic graded index profile.

Disadvantageously, when the connectors are separated, the bare fiber is exposed and coated with sticky optical fluid. In practice, this fluid quickly becomes contaminated with dust and other materials from the environment and optical transmittance is reduced significantly. Also, because the fiber is pressed into the conical recess each time the connectors are joined, the multiple impacts with the sharp edge of the fiber eventually damage the plastic surface. Both problems result in the requirement that the entire central plastic lens unit be replaced quite frequently to assure continued low loss. Also, the fiber ends are exposed to damage when the connectors are separated, so retractable fiber protective means are required in the connector end housings to minimize breakage. Finally, although the conical guide surface centers fibers of different diameters, the amount of displacement of the fiber end from the lens varies with different diameter fibers. Since the lenses are so small, compared to an expanded beam connector in accordance with the invention set forth in this specification, this tolerance is much more critical.

Another version described in the Holzman patent includes another fluid "field lens" in the center in a configuration which provides an expanded beam. This is made in two parts, with one concave surface of the field lens molded on the interface surface of each half. The parts are, in theory, separable, but the field lens must be filled with high-index fluid when mated. Disadvantageously, there is no means provided for filling the field lens cavity with bubble-free optical fluid each time the connectors are to be joined, and care is required to keep the fluid from leaking out from the interface over extended periods of service.

h. Finally, the patented literature includes numerous low-precision fiber or fiber bundle interface devices, such as:

U.S. Pat. No. 3,649,098 to Suverison, issued Mar. 14, 1972, relates to a lens structure of a fiber optic assembly which is adapted to be detachably connected to an apertured panel, for example in automobile vehicle applications as an indicating means. It indicates when a remote light bulb is burned out via a fiber optic bundle.

U.S. Pat. No. 3,734,594 to Trambarulo, issued May 22, 1973, describes an optical fiber splicer having a deformable angular core disposed between a pair of metallic pressure plates. The fibers to be spliced are inserted into opposite ends of the core and a longitudinal force applied to the plates causes the core to deform radially, thereby securing the fibers.

U.S. Pat. No. 3,948,582 to Martin, issued Apr. 6, 1976, discloses an optical fiber connector with separately formed bodies of substantially elongated form. Each body has an axial bore in which the optical fibers can be fitted. The end of one body defines a socket adapted to mate with a plug-shaped end of the second body.

U.S. Pat. No. 4,056,305 to McCartney et al, issued Nov. 1, 1977, describes a connector having a deformable elastomeric alignment element having a through bore. Two sets of three equal diameter cylindrical rods are mounted in opposite ends of the bore so as to define a space therebetween for receiving an optical fiber. The rods have an interference fit in the central portion of the bore so that compression of the rods results in laterally aligning the fibers.

Some of these, generally, utilize large-diameter fibers or bundles for short communications links or simply as light guides to remote indicator panels or illumination devices. They are not relevant to the extremely tight-tolerance requirements of modern small-diameter, low-loss communications systems applications to which the present invention is addressed.

SUMMARY OF THE INVENTION

Other objects of this invention are to provide for a new and improved optical fiber-to-fiber connector which has one or more of the following features:
a. can be manufactured entirely of a few inexpensive molded parts,
b. provides connections of extremely low insertion loss, even with small-diameter glass communications-grade fibers,
c. is largely insensitive to minor scratches and dirt on ends,
d. is tolerant to lateral displacement alignment erros, (many fiber diameters offset),
e. is insensitive to axial separation of connector halves (up to several centimeters),
f. can optimally interconnect fibers with different diameters and/or numerical apertures, and
g. can be quickly and easily field-installed with only a fiber cleaver and epoxy (no microscopes, jigs, adjustments, etc.).

In accordance with one embodiment of the invention, an optical fiber connector body is molded of optical quality transparent plastic. A lens is provided with a convex surface molded into the body, recessed inward from a reference surface. A third surface, parallel to the reference surface, forms a focal plane for the lens, and has a point thereon one focal length from the convex lens surface. In accordance with certain features, the reference surface and the third surface can each be planar. A substantially cylindrical cavity can be recessed from a fourth surface; a smaller cavity is further recessed therewithin terminating at the third surface, the point lying on an axis of the cylindrical cavity. At least one groove can be formed within the wall of the substantially cylindrical cavity, extending from the fourth surface to the smaller cavity. At least a portion of an outer surface of the body can be cylindrical with the reference surface being flat and annular.

In accordance with another embodiment of the invention, a fiber optic connector includes an optical fiber connector body together with means for supporting an optical fiber in engagement with the point on the body. In accordance with certain features, the support can be provided by an elastomeric fiber holder adapted to fit within the substantially cylindrical cavity of the body and frictionally engage with the wall thereof. The holder has an axial hole for supporting the optical fiber in engagement with the point on the body. Index matching material can be used at an interface of the fiber with the third surface, which can be drawn by capillary action through the axial hole.

In accordance with yet another embodiment of the invention, a precision molded elastomeric optical fiber holder includes a molded cylindrical piece of elastic material having an axial hole from one end to another, with the hole being tapered near one only of the ends. The tapered opening is greater than either the diameter of the hole or the diameter of the optical fiber. The diameter of the hole, prior to insertion of the fiber, is slightly smaller than the diameter of the optical fiber.

In accordance with still another embodiment of the invention, a new combination includes two optical fiber connectors and means for joining them together. Each optical fiber connector includes its respective optical fiber connector body and a precision molded elastomeric optical fiber holder. Each optical fiber connector body is molded of optical quality transparent plastic, each having a planar, annular reference surface adapted to engage with each other. A lens having a convex surface is molded into each connector body, recessed inward from its reference surface. A third surface, parallel to the reference surface, forms the focal plane of the lens. A point on the third surface is one focal length from the convex lens surface. A substantially cylindrical cavity is recessed from a fourth surface of each body, and a smaller cavity is further recessed therewithin, terminating at the third surface, the point lying on an axis of its associated cylindrical cavity. Each precision molded elastomeric optical fiber holder includes a molded cylindrical piece of elastic material having an axial hole for an optical fiber, the hole being tapered at one end only. The diameter of the axial hole is slightly smaller than the diameter of the optical fiber which passes therethrough. Likewise, the diameter of the cylindrical cavity is slightly smaller than the diameter of the elastomeric fiber holder. The two connectors are joined together so that their annular reference surfaces engage each other. In accordance with certain features of the invention, each connector body can be cylindrically formed with a slightly raised ring formed about its circumference near its reference surface. A union member includes a slightly elastic cylindrical tube having a shaped lip on the inside circumference on both ends. When the bodies are engaged, the lips become slightly stretched and ride on the side slopes of the rings, providing a constant elastic restoring force which pulls the connector bodies together so their reference planes are in contact. The connectors can be provided with orifices extending from their smaller cavities to their exterior surfaces, as by providing at least one groove formed in the walls of the cylindrical bodies, extending from the smaller cavities outward to the third surfaces thereof.

BRIEF DESCRIPTION OF THE DRAWING

Other objects, advantages, and features of this invention, together with its construction and mode of operation, will be made more apparent from the following description, when read in conjunction with the accompanying drawing, in which.

DESCRIPTION OF PREFERRED EMBODIMENTS

Figure 1:
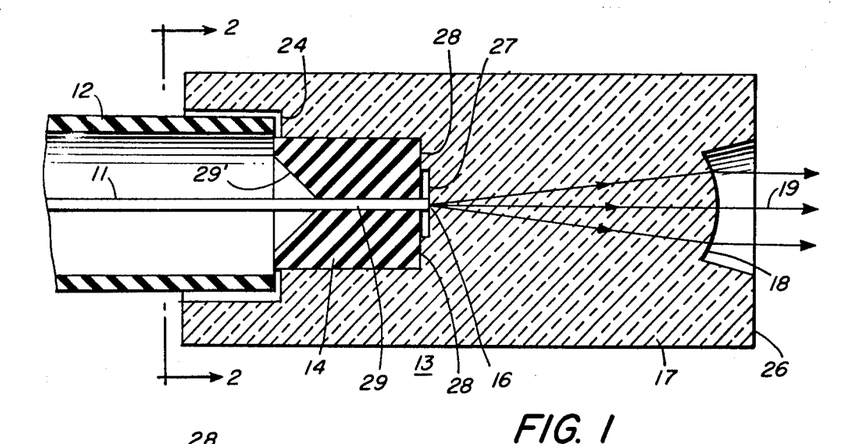
FIG. 1 is a cross-sectional view of one embodiment of the invention, depicting an optical connector including a connector body and fiber holder, together with a portion of an optical fiber with jacket.
Figure 4:
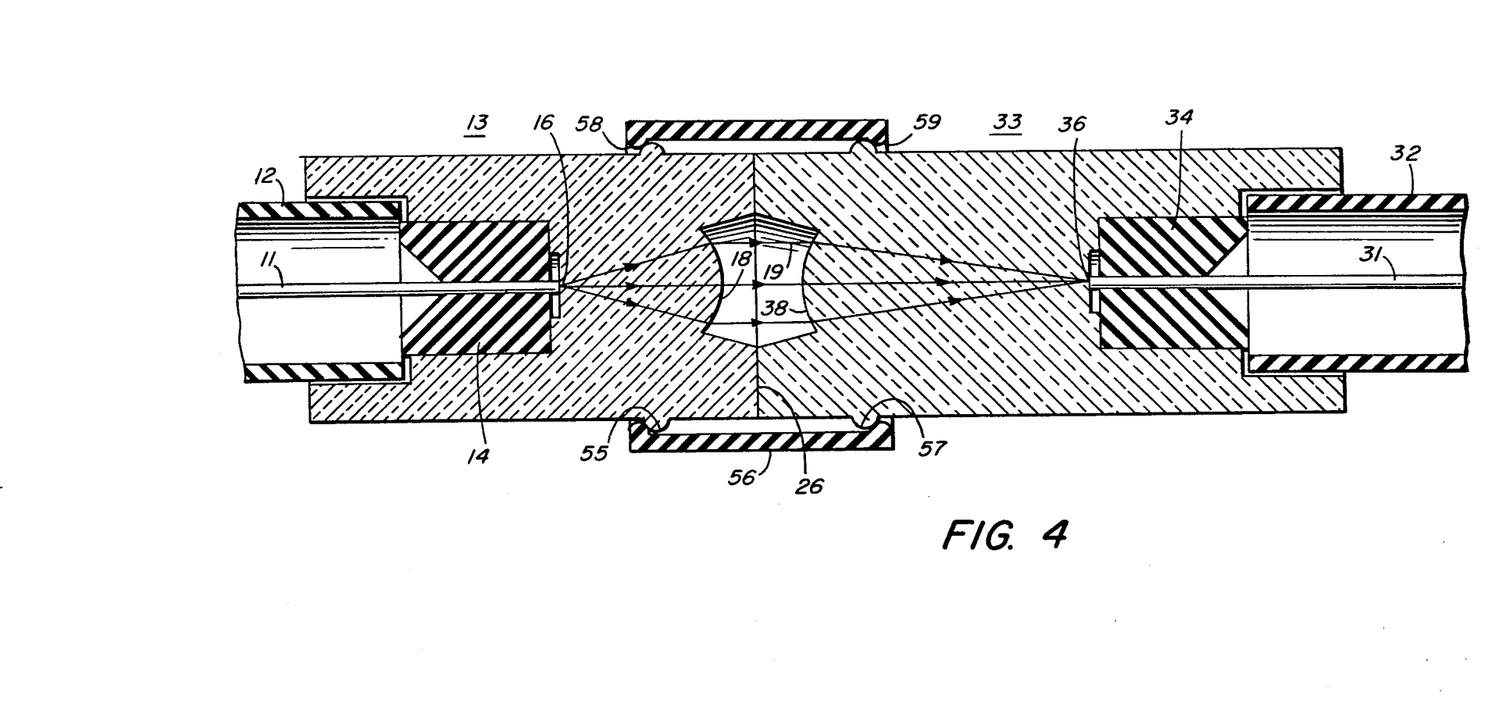
FIG. 4 is a cross-sectional view of a pair of optical connectors (together with fiber holders, and optical fibers with jackets) and a snap-together union section, in accordance with yet another embodiment of the invention.

As depicted in FIGS. 1 and 4, an optical fiber 11, 31 includes a protective outer jacket 12, 32.

The connector 13, as shown in FIG. 1, includes two molded parts: an elastomer splicer-like fiber holder 14 which receives a field-inserted fiber 11 and automatically aligns it precisely to a specific point 16 within the connector 13, and an optical plastic connector body part 17 with a lens surface 18 molded into it exactly one focal length from the fiber end 16. Light exiting from the fiber end 16 (which has been index-matched with optical epoxy or other transparent material, not shown, to the plastic body part 17) propagates through the optical plastic with a diverging wavefront until it encounters the curved plastic-to-air interface which constitutes the molded lens surface 18. This lens, which preferably is anti-reflection coated to minimize losses, collimates the light into a parallel beam 19 approximately 1 to 5 mm diameter, traveling away in air without diverging significantly—much like a conventional laser beam. FIG. 1 illustrates a single fiber-terminating connector 13, but does not show means for coupling it to another such connector (which is discussed later). As shown, the connector 13, is made of two molded parts 14, 17. The connector body 17 is molded of a rigid optical quality transparent plastic; the self-aligning fiber holder 14 is molded of a semi-rigid plastic or elastomeric material. The fiber holder 14 is similar in principle, though with important differences, to the elastomeric splices described in U.S. Pat. Nos. 4,257,674 and 4,325,607 issued Mar. 24, 1981 and Apr. 20, 1982, respectively, and can be made according to techniques described in either patent.

Although the connector 13, including the fiber holder 14 and connector body 17, is substantially cylindrically symmetric around a common central axis, as shown in the cross-sectional view of FIG. 1, an exception is made for air/epoxy relief slots 21, 22 in the wall of an otherwise cylindrical cavity 23 recessed within the connector body from a surface 24. The cylindrically symmetric configuration is not essential to this invention: other shapes can be used as long as the fiber, the lens axis, and the alignment surface have the proper relationship to one another as described hereinafter.

The connector body 17 is a precision molded part of optical quality plastic. It can be made by any of a variety of precision plastic optics technologies, including casting with Emerson & Cuming Stycast 1269A Crystal Clear Epoxy casting resin. However, for low-cost mass production, injection molding with acrylic materials such as Rohm & Haas V811 Plexiglas is believed desirable for achieving extremely high quality optical surfaces and stable, precise dimensions. The precision machining involved is in making the original mold, not in each individual connector.

The connector body 17 has an outer cylindrical shape. A single-surface lens 18 is formed on one end and slightly recessed from an annular reference surface 26. For lowest reflection losses, the lens 18 is anti-reflection coated. The optical axis of the lens 18 is positioned desirably along the axis of the connector, and the reference surface 26 is constructed very precisely perpendicular to the optical axis so that the mating of the reference surfaces 26 of two connectors 13 is the means for aligning their optical axes angularly relatively to one another.

At the other end of the cylindrical connector body 17, other surfaces are molded. A surface 27 is parallel to the reference surface 26, and is located at the focal plane of the lens 18, as shown. Surfaces 28, 28 are parallel to the surface 27 and are located a small distance further from the lens 18.

The elastomer fiber holder part 14 is inserted into the close-fitting cylindrical hole 23 which is centered on the optical axis. A preferred technique is to make the hole 23 in the connector body 17 slightly smaller (a few mils) than the outside dimension of the fiber holder 14. Since the fiber holder 14 is elastic, it fits into the hole 23, and symmetric restoring forces center it on axis. The fiber holder 14 is pushed in until it contacts the surfaces 28, 28, leaving a small space between it and the focal plane 27. When the tolerances of the connector body 17 and the fiber holder 14 are sufficient, and the fiber holder 14 is properly inserted into the mating hole 23 in the back of the connector body 17, the axial hole 29 through the center of the fiber holder 14 (which is a fraction of a mil smaller than the diameter of the fiber 11 to be inserted) is accurately in line with the optical axis of the lens 18.

This connector 17 can easily be field-installed by the user as follows: The fiber 11 is cleaved or otherwise prepared to have a smooth, flat surface, perpendicular to the fiber axis. The better the cleave quality, the lower the insertion loss of the resulting connections. When the fiber 11 is coated, the coating is removed, leaving a bare fiber slightly longer than the length of the hole 29 in the fiber holder 14. As an example, FIG. 1 illustrates a protective jacket 12 for a fiber 11 secured along the section of the connector 13 between surfaces 24 and 30. When present, the jacket or cabling material 12 is cut back to the length required; in the case illustrated in FIG. 1, the jacket 12 is cut back to expose a length of fiber 11 a little longer than the distance between surfaces 24 and 27.

Next, a drop of index-matching material, such as epoxy resin (having an index of refraction, when cured, close to that of the fiber 11 and the plastic connector body 17) is placed in the tapered entrance hole 29 of the fiber holder 14. The resin is drawn into the hole 29 by capillary action, and continues to flow into the gap between the surfaces 27 and 28. Air displaced by the resin escapes through the air/epoxy relief slots, consisting of a gap between the surfaces 27, 28, and the grooves 21, 22 molded along the wall between the surfaces 24 and 27, as shown. Depending on the viscosity of the epoxy resin, the size of the relief slots, and other properties of the resin, the elastomer fiber holder 14, and the plastic body 17, the epoxy may continue to be pulled by capillary action all the way to fill the relief slots. The cleaved fiber 11 is then inserted into the hole 29 in the fiber holder 14, and pushed inward until it contacts the plastic focal plane 27 at the focal point 16 on the lens 18 axis. This operation requires no tools, or microscope, since the hole 29 is tapered out to an entrance size 29' easily "threaded" with the fiber 11 by eye, and the contacting of the fiber 11 with the plastic wall is easily felt by the fingers holding the fiber 11. Because the insertion of the fiber 11 has stretched the hole 29 diameter in the fiber holder 14, elastic restoring forces automatically align the fiber 11 with the original hole axis, which is also the optical axis by design. The stretched elastomer holds the fiber 11 in place when the installer releases the fiber 11, and during the curing time for the epoxy, as long as the fiber 11 is not under significant tension. Additional epoxy can be placed on the end of the jacket 12 which is inserted into the opening between surfaces 24 and 30. The epoxy is then allowed to cure. This completes the installation of the connector 13 onto the fiber 11 and jacket 12. The connector to be mated to it is installed in the same fashion.

Figure 2:
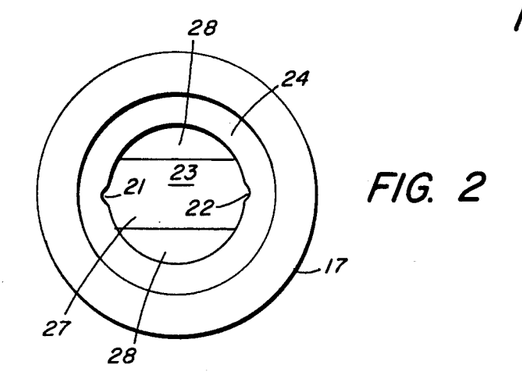
FIG. 2 is an end view, taken along the line 2—2 of FIG. 1, depicting the connector body as seen from the fiber end (fiber holder, fiber, and jacket, not shown)
Figure 3:
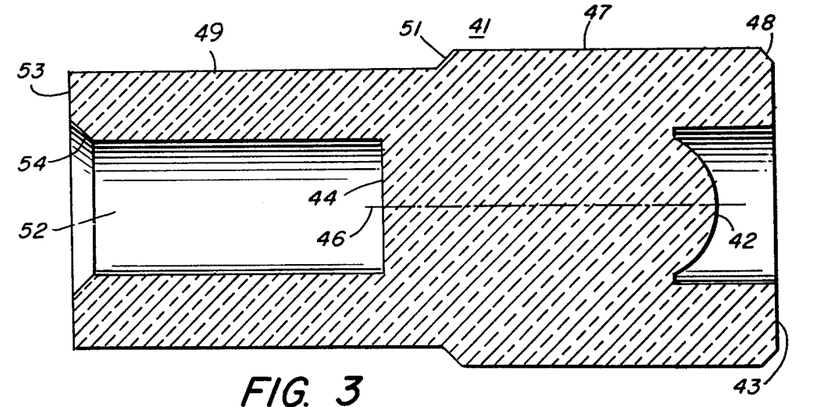
FIG. 3 is a cross-sectional view of a connector body in accordance with another embodiment of the invention.

FIG. 3 is a cross-sectional view of a preferred connector body 41, similar in certain respects to the connector body 17 of FIGS. 1 and 2.

The connector body 41 is constructed of optical plastic with a convex lens surface 42 slightly recessed inward from an annular reference surface 43. The lens surface 42 is molded one focal length from a second reference surface 44 against which the end of an optical fiber (not shown) abuts. The connector body 41 is symmetrical about its central axis 46 having a large cylindrical section 47 near its reference surface 43 (with a small chamfer 48 where they meet to maintain integrity of the body 41) and a slightly smaller cylindrical section 49 posterior to the reference surface 43. A chamfer 51 joins the sections 47 and 49. The foregoing shape of the connector body 41 is highly desirable since two such bodies can be joined by an elastic union member (not shown) comprising a slightly elastic cylindrical tube (for receiving the sections 47) having shaped lips on the inside circumference on both ends so that, when two such bodies 41 are engaged, the union member stretches and rides on the chamfers 51, thus providing a constant restoring force which pulls the connector bodies together so their reference surfaces 43 are in contact.

The reference surface 44 is at the base of a cylindrical cavity 52 having a common axis 46. The cavity 52 is recessed from a plane surface 53 which is perpendicular to the axis 46. The cavity 52 is tapered outward at 54 to the surface 53. The taper 54 can act as a stop for a fiber holder, not shown.

In accordance with a specific configuration of the connector body 41, the length from surface 43 to surface 53 is 0.36 inch. The radius of the section 47 is 0.078 inch. The radius of the section 49 is 0.070 inch. The radius of the cavity 52 is 0.036 inch, concentric to the optical axis to within 0.00002 inch. The lens surface 42 is recessed inward from the reference surface 43 by 0.04 inch. The nominal value of the focal length, 0.1450 inch, used in calculating the lens shape for $n = 1.4845$, may be varied experimentally to compensate for uncertainty of n at an operating wavelength of 840 nm. The reference surface 43 is perpendicular to the optical axis 46 to within 15 seconds of an arc. The chamfer 48 is displaced inward, axially and radially, by 0.005 inch. The radius of the lens surface 42 is 0.035 inch, the radius of its associated aperture being 0.040 inch. The chamfer 51 is 0.010 inch in axial length, starting 0.16 inch from the surface 43. The chamfer 54 is displaced, radially and axially, by 0.010 inch.

FIG. 1 does not show specific means for holding two connectors 13 together, because such means can vary among a wide variety of potential applications in fiber optical systems. The only requirements for such means are (a) that the reference surface 26 of the two connectors 13 be held in intimate contact to maintain the required critical angular tolerances, and (b) that the optical axes of the two connectors 13 be held approximately in line, with a lateral displacement tolerance of several fiber diameters in general.

FIG. 4 illustrates, inter alia, a representative means for holding two connectors 13, 33 together in proper alignment. It includes a simple snap-together means of one molded part 56. The connectors 13, 33 in FIG. 4 are only slightly different from the one in FIG. 1, in that they have a slightly raised ring 55, 57 around their circumference near the lens 18, 38 ends. The additional "union" piece 56 is a slightly elastic cylindrical tube with a shaped lip 58, 59 on the inside circumference on both ends. This part 56 can be made in a variety of ways, including molding. Its dimensions are such that it slips easily over the connector 13 past the reference surface 26, expands a little to get its end lip 58 over the raised ring 55 on the connector 13, and contracts again as it is pushed past the ring 55. The second connector 33 is then similarly slipped into the other end of the union 56 and is pushed until its raised ring 57 is past the lip 59 of the union 56. When both connectors 13, 33 are fully engaged in the union 56, the union lips 58, 59 become slightly stretched and ride on the side slope of the connector rings 55, 57, as shown in FIG. 4, thus providing a constant elastic restoring force which pulls the connectors 13, 33 together so that their reference surfaces 26 are in contact. To separate them, either or both connectors 13, 33 can be pulled out of the union 56 with a small tug. The details and design considerations of such connection means are well known in the field of plastic molded snap-together electrical connectors. When desired, the union 56 can be constructed as a permanent part of one connector, for male-female style connection.

Referring to FIG. 4, when a connector 33 is placed in the path of the beam 19, facing the connector 13 and properly aligned angularly therewith, the lens 38 of the second connector 33 focuses the light beam down through the plastic body onto the face 36 of the second fiber 31, thus completing the connection between the two fibers 11, 31. Because the exit pupil of the first connector 13, and the entrance pupil of the second connector 33, are each located at infinity, the rays respectively exiting or entering them being essentially parallel to their optical axes, the connectors can be termed "telecentric optical fiber connectors". An imaging system consisting of two telecentric optical systems back-to-back, such as the two joined telecentric connectors 13, 33, enjoys several significantly advantageous characteristics from the point of view of optical fiber connection:

a. Light rays guided within an optical fiber are constrained to travel within a very small diameter region around the fiber axis, but they have a significant angular range. When they leave the end of the fiber, they diverge rapidly both because of this initial angular spread and because of diffraction spreading from a small diameter concentration of energy. The telecentric connector essentially converts the initial small-diameter guided light distribution into a much larger diameter free-space unguided beam traveling in the same direction. When the unguided beam has been magnified M times the guided beam diameter, the angular spread of the rays due to both geometrical and diffraction spreading are believed to be reduced by this same factor, M. This permits a much greater separation between the ends of the two telecentric connectors (about $M^2$ times greater) than was possible between the two fiber ends themselves. In practice, the permissible separation has been found in general to be several centimeters.

b. Permissible lateral displacement tolerances (perpendicular to the optical axis) are also believed to be multiplied by M.

c. These looser tolerances on linear displacement misalignment are achieved at the expense of tighter angular tolerances, again by a factor of M. However, the precise angular alignment required is very easily achieved in the embodiments described.

FIG. 4 illustrates how different focal-length telecentric connectors can be made for different diameter or numerical aperture fibers, so that they can be connected for optimal light energy throughput. When the lenses in the two connectors 13, 33 have different focal lengths, and the fiber ends are located at the respective focal points 16, 36 of each, then as light passes from the first to the second, an image of the first fiber end is still imaged on the end of the second fiber—but with a change of size and angular spread. The image becomes magnified in direct proportion to the ratio of the focal lengths, while the angular range of the light rays are reduced by the same ratio (thus, the input numerical aperture to the second fiber becomes reduced). Standard optical design optimization techniques can thus be utilized to optimally match two different types of fibers according to requirements of specific applications. Other modifications can be performed to achieve a desirable distribution of modes launched within the second fiber. The variables readily available to an optical designer are: (1) the focal lengths, (2) the position of the fiber ends relative to their respective focal points, (3) the shapes of the respective lenses, and (4) for fine tuning, the distance between the lenses (an adjustable union can be used, when desired).

The telecentric optical fiber connector in accordance with this invention has been designed specifically to meet the needs of optical communications systems using premium-quality, extremely low loss fibers, such as Corning Corguide brand fibers. In such systems, insertion losses greater than a few tenths of a dB are significant drains on the system power level. However, the core diameters of such fibers are so small, 63 micrometers for example, that alignment tolerances have been impossible to achieve in economical and field-installable connector designs of known prior art connectors.

A major difference, other than lower cost and less complexity, between the present design and the three other optical imaging designs, discussed earlier, using conventional imaging lenses, spheres, and gradient-index lenses, is the elastomeric self-aligning fiber holder 14. Using this, a user can quickly and easily install the connector 13 to a cleaved fiber end and obtain an almost perfect positioning and angular alignment of the fiber within the connector—with no adjustments, microscopic inspection, or special tools.

Other modifications may be performed without departing from the spirit and scope of this invention. For example, an aspheric lens surface can be specifically designed to reduce throughput-degrading optical aberrations. The special aspheric lens fabrication techniques, being applied only once to the mold, not to the individual molded parts, would be cost effective. Types of index-matching materials in lieu of epoxy can be used at the fiber-to-plastic junction. For example, the space between surfaces 27 and 28 in FIG. 1 can be filled during construction with an appropriate fluid or optical gel. Then, the fiber and jacket or cabling materials can be secured in place by other mechanical means without the use of epoxy.

What is claimed is:

1. An optical fiber connector body molded of optical quality transparent plastic having
a reference surface;
a lens having a convex surface molded into said connector body, recessed inward from said reference surface; and
a third surface forming a focal plane of said lens, and having a point thereon one focal length from said lens surface, said third surface being parallel to said reference surface.

2. The body as recited in claim 1 wherein said reference surface and said third surface are each planar.

3. The body as recited in claim 1 further having a substantially cylindrical cavity recessed from a fourth surface, and a smaller cavity further recessed therewithin terminating at said third surface, said point lying on an axis of said cylindrical cavity.

4. The body as recited in claim 3 further having at least one groove formed within the wall of said substantially cylindrical cavity, extending from said fourth surface to said smaller cavity.

5. A fiber optic connector comprising
(a) an optical fiber connector body as recited in claim 4; and
(b) means for supporting an optical fiber in engagement with said point on said body.

6. A fiber optic connector comprising
(a) an optical fiber connector body as recited in claim 4; and P0 (b) an elastomeric fiber holder, adapted to fit within said substantially cylindrical cavity of said body and frictionally engage with said wall thereof, having an axial hole for supporting an optical fiber therewithin and in engagement with said point on said body.

7. The connector as recited in claim 6 further comprising index-matching material at an interface of said fiber and said third surface.

8. The connector as recited in claim 7 wherein said index-matching material is drawn by capillary action through said axial hole.

9. A fiber optical connector comprising
(a) an optical fiber connector body as recited in claim 1; and
(b) means for supporting an optical fiber in engagement with said point on said body.

10. The connector as recited in claim 9 further comprising index-matching material at an interface of said fiber and said third surface.

11. The body as recited in claim 1 wherein
at least a portion of an outer surface of said body is cylindrical, and
said reference surface is flat and annular.

12. A connector for an optical fiber having a first diameter, comprising
(a) an optical fiber connector body molded of optical quality transparent plastic having
 (i) a reference surface,
 (ii) a lens having a convex surface molded into said connector body, recessed inward from said reference surface,
 (iii) a third surface forming a focal plane of said lens, and having a point thereon one focal length from said lens surface, said third surface being parallel to said reference surface,
 (iv) a substantially cylindrical cavity, having a second diameter, recessed from a fourth surface, and a smaller cavity further recessed therewithin terminating at said third surface, said point lying on an axis of said cylindrical cavity, and
 (v) at least one groove formed within the wall of said cylindrical cavity, extending from said fourth surface to said smaller cavity; and
(b) a precision molded elastomeric optical fiber holder, for holding said optical fiber, said fiber holder comprising a molded cylindrical piece of elastic material having a third diameter and having an axial hole of a fourth diameter from one end of said piece to another end thereof, said molded piece having said hole tapered to a fifth diameter near one only of said ends,
wherein said fifth diameter is greater than each of said first diameter and said fourth diameter, and
wherein, prior to insertion of said fiber, said fourth diameter is smaller than said first diameter.

13. The connector as recited in claim 12 wherein said cylindrical piece of elastic material is inserted into said substantially cylindrical recessed cavity.

14. The connector as recited in claim 13 wherein, prior to insertion, said second diameter is slightly smaller than said third diameter.

15. In combination,
(A) a first optical fiber connector for a first optical fiber having a first diameter comprising
 (1) an optical fiber connector body molded of optical quality transparent plastic having
  (a) a planar, annular, reference surface,
  (b) a lens having a convex surface molded into said connector body, recessed inward from said reference surface,
  (c) a third surface forming a focal plane of said lens, and having a point thereon one focal length from said lens surface, said third surface being parallel to said reference surface, and
  (d) a substantially cylindrical cavity, having a second diameter, recessed from a fourth surface, and a smaller cavity further recessed therewithin terminating at said third surface, said point lying on an axis of said cylindrical cavity, and
 (2) a precision molded elastomeric optical fiber holder, for holding said first optical fiber, said fiber holder comprising a molded cylindrical piece of elastic material having a third diameter and having an axial hole of a fourth diameter from one end of said piece to another end thereof, said molded piece having said hole tapered to a fifth diameter near one only of said ends,
wherein said fifth diameter is greater than each of said first diameter and said fourth diameter, and
wherein, prior to insertion of said first fiber, said fourth diameter is smaller than said first diameter;
(B) a second optical fiber connector for a second optical fiber having a sixth diameter comprising
 (1) an optical fiber connector body molded of optical quality transparent plastic having
  (a) a planar, annular, reference surface adapted to engage with said first optical fiber connector body reference surface,
  (b) a lens having a convex surface molded into said second connector body, recessed inward from said second body reference surface,
  (c) a seventh surface forming a focal plane of said second connector body lens, and having a point thereon one focal length from said second connector body lens surface, said seventh surface being parallel to said second connector body reference surface, and
  (d) a substantially cylindrical cavity, having a seventh diameter, recessed from an eighth surface, and a smaller cavity further recessed therewithin terminating at said seventh surface, said seventh surface point lying on an axis of said second connector body cylindrical cavity, and
 (2) a second precision molded elastomeric optical fiber holder, for holding said second optical fiber, said second fiber holder comprising a molded cylindrical piece of elastic material having an eighth diameter and having an axial hole of a ninth diameter from one end of said second fiber holder piece to another end thereof, said second fiber holder piece having its axial hole tapered to a tenth diameter near one only of its said ends,
wherein said tenth diameter is greater than each of said sixth diameter, and said ninth diameter, and
wherein, prior to insertion of said second fiber, said ninth diameter is smaller than said sixth diameter; and
(C) means for joining said first optical connector to said second optical connector so that said first optical connector planar annular reference surface engages with said second optical connector planar annular reference surface.

16. The combination as recited in claim 15 wherein said first, second, third, fourth, and fifth diameters do not necessarily correspond, respectively, to said sixth, seventh, eighth, ninth, and tenth diameters.

17. The combination as recited in claim 15 wherein said first optical fiber connector body is cylindrically formed with a slightly raised ring formed about its circumference near its reference surface, and wherein said second optical fiber connector body is cylindrically formed with a slightly raised ring formed about its circumference near its reference surface, and further comprising a union member including a slightly elastic cylindrical tube having a shaped lip on the inside circumference on both ends, whereby, when said connector bodies are engaged, said union member lips become slightly stretched and ride on the side slopes of said rings, thus providing a constant elastic restoring force which pulls the connector bodies together so their reference planes are in contact.

18. The combination as recited in claim 17 wherein each of said connectors are provided with orifices extending from said smaller cavities to exterior surfaces thereof.

19. The combination as recited in claim 18 wherein said first optical fiber connector body is provided with at least one groove formed within the wall of its cylindrical body, extending from said fourth surface to its contiguous smaller cavity, and wherein said second optical fiber connector body is provided with at least one groove formed within the wall of its cylindrical body, extending from said eighth surface of its contiguous smaller cavity.

20. An optical fiber connector body molded of optical quality transparent plastic having an optical axis and having
   (a) a reference surface;
   (b) a lens on said optical axis having a convex surface molded into said connector body, recessed inward from said reference surface; and
   (c) means for mating an optical fiber with said connector body along said optical axis one focal length from said lens surface.

21. The body as recited in claim 20 wherein said reference surface is perpendicular to said optical axis.

22. The body as recited in claim 20 further having a substantially cylindrical cavity recessed from a third surface, and a smaller cavity further recessed therewithin for positioning an end of an optical fiber one focal length away from said lens surface, an axis of said fiber lying on an axis of said cylindrical cavity, said optical axis and said cavity axis being coincident.

23. A fiber optical connector comprising
   (a) an optical fiber connector body as recited in claim 22; and
   (b) means for supporting an optical fiber along said optical axis so that an end thereof is oriented one focal length from said lens surface.

24. A fiber optic connector comprising
   (a) an optical fiber connector body as recited in claim 22; and
   (b) an elastomeric fiber holder, adapted to fit within said substantially cylindrical cavity of said body and frictionally engage with the wall of said substantially cylindrical cavity, having an axial hole for supporting an optical fiber therewithin so that an end of said fiber is positioned one focal length from said lens surface.

25. The body as recited in claim 20 wherein
at least a portion of an outer surface of said body is cylindrical, and;
said reference surface is flat and annular.

26. A fiber optic connector comprising
   (a) an optical fiber connector body as recited in claim 20; and
   (b) means for supporting an optical fiber along said optical axis so that an end thereof is oriented one focal length from said lens surface.

27. A connector for an optical fiber having a first diameter, comprising
   (a) an optical fiber connector body molded of optical quality transparent plastic having an optical axis and having
      (i) a reference surface,
      (ii) a lens on said optical axis having a convex surface molded into said connector body, recessed inward from said reference surface,
      (iii) a focal plane of said lens having a point thereon oriented on said optical axis one focal length from said lens surface, said focal plane being parallel to said reference surface, and
      (iv) a substantially cylindrical cavity, having a second diameter, recessed from a third surface, and a smaller cavity further recessed therewithin so as to position an end of said optical fiber at said focal plane, said point lying on an axis of said cylindrical cavity, said optical axis and said cavity axis being coincident, and
   (b) a precision molded elastomeric optical fiber holder, for holding said optical fiber, said fiber holder comprising molded circumferential means of elastic material having a circumscribed diametrical dimension of a third diameter and having an axial hole with an inscribed diameterical dimension of a fourth diameter from one end of said means to another end thereof, said molded means having said hole tapered at one of said ends to a dimension exceeding said first diameter, wherein, prior to insertion of said fiber, said fourth diameter is smaller than said first diameter.

28. The connector as recited in claim 27 wherein said circumferential means of elastic material is inserted into said substantially cylindrical recessed cavity, and wherein, prior to insertion, said second diameter is slightly smaller than said third diameter.

29. In combination,
(A) a first optical fiber connector for a first optical fiber comprising
   (1) an optical fiber connector body molded of optical quality transparent plastic having an optical axis and having
      (a) a planar, annular, reference surface,
      (b) a lens having a convex surface molded into said connector body, recessed inward from said reference surface,
      (c) a focal plane of said lens having a point thereon oriented on said optical axis one focal length from said lens surface, said focal plane being parallel to said reference surface, and
      (d) a substantially cylindrical cavity recessed from a third surface, and a smaller cavity further recessed therewithin so as to position an end of said first optical fiber at said focal plane, said point lying on an axis of said cylindrical cavity, said optical axis and said cavity axis being coincident, and
   (2) a precision molded elastomeric optical fiber holder for holding said first fiber comprising molded circumferential means of elastic material having an axial hole from one end of said means to another end thereof, said molded means having said hole tapered at one of said ends to a dimension exceeding a cross-sectional dimension of said first optical fiber,
   wherein, prior to insertion of said first fiber, said axial hole is smaller than said first optical fiber;
(B) a second optical fiber connector for a second optical fiber comprising
   (1) an optical fiber connector body molded of optical quality transparent plastic having an optical axis and having (a) a planar, annular, reference surface adapted to engage with said first optical fiber connector body reference surface, (b) a lens having a convex surface molded into said second connector body, recessed inward from said second body reference surface, (c) a focal plane of said second connector body lens having a point thereon oriented on said second connector body optical axis one focal length from said second connector body lens surface, said second connector body focal plane being parallel to said second connector body reference surface, (d) a substantially cylindrical cavity recessed from a sixth surface, and a smaller cavity further recessed therewithin so as to position an end of said second optical fiber at said second focal plane, said second focal point lying on an axis of said second connector body cylindrical cavity, said second connector optical axis and said second connector cylindrical cavity axis being coincident, and (2) a second precision molded elastomeric optical fiber holder for holding said second fiber comprising molded circumferential means of elastic material having an axial hole from one end of said second fiber holder molded means to another end thereof, said second fiber holder molded means having its axial hole tapered at one of its said ends to a dimension exceeding a cross sectional dimension of said second optical fiber, wherein, prior to insertion of said second fiber, said second molded means axial hole is smaller than said second fiber; and (C) means for joining said optical connectors together so that said first optical connector planar annular reference surface engages with said second optical connector planar annular reference surface.

* * * * *